United States Patent
Marcu et al.

(10) Patent No.: US 7,612,804 B1
(45) Date of Patent: Nov. 3, 2009

(54) METHODS AND APPARATUSES FOR IMAGE PROCESSING

(75) Inventors: Gabriel G. Marcu, San Jose, CA (US); Steve Swen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 793 days.

(21) Appl. No.: 11/059,110

(22) Filed: Feb. 15, 2005

(51) Int. Cl.
*H04N 5/235* (2006.01)
*H04N 5/262* (2006.01)
*G06K 9/40* (2006.01)

(52) U.S. Cl. .................. 348/222.1; 348/239; 382/254

(58) Field of Classification Search ............ 348/222.1, 348/218.1, 239, 362; 382/254
See application file for complete search history.

(56) References Cited

U.S. PATENT DOCUMENTS

| | | | |
|---|---|---|---|
| 5,264,940 A | | 11/1993 | Komiya et al. |
| 5,801,773 A | * | 9/1998 | Ikeda ..................... 348/229.1 |
| 5,914,748 A | * | 6/1999 | Parulski et al. ............ 348/239 |
| 6,593,970 B1 | | 7/2003 | Serizawa et al. |
| 6,825,884 B1 | | 11/2004 | Horiuchi |
| 7,084,905 B1 | * | 8/2006 | Nayar et al. ............. 348/222.1 |
| 7,391,444 B1 | * | 6/2008 | Nomura et al. ............ 348/239 |
| 2001/0021276 A1 | | 9/2001 | Zhou |
| 2003/0095189 A1 | * | 5/2003 | Liu et al. ................. 348/208.4 |
| 2003/0095192 A1 | | 5/2003 | Horiuchi |
| 2004/0239798 A1 | * | 12/2004 | Nayar et al. .............. 348/362 |
| 2005/0057670 A1 | * | 3/2005 | Tull et al. ................. 348/241 |
| 2005/0099504 A1 | * | 5/2005 | Nayar et al. ............. 348/222.1 |
| 2005/0275747 A1 | * | 12/2005 | Nayar et al. .............. 348/362 |

OTHER PUBLICATIONS

Paul E. DeBevee, et al. "Recovering High Dynamic Range Radiance Maps from Photographs". SIGGRAPH, pp. 369-378. 1997.
Garrett M. Johnson, et al. "Rendering HDR Images". IS&T/SID 11th Color Imaging Conference, Scotsdale, Arizona. pp. 36-41. 2003.
Laurence Meylan, et al. "Bio-inspired Color Image Enhancement". IS&T SPIE Electronic Imaging, San Jose. 2004.
Sumanta N. Pattanaik, et al. "Multiscale Model of Adaptation, Spatial Vision and Color Appearance". Proceedings of the Sixth Color Imaging Conference, Nov. 1998.

(Continued)

*Primary Examiner*—Nhan T Tran
*Assistant Examiner*—Trung Diep
(74) *Attorney, Agent, or Firm*—Blakely, Sokoloff, Taylor & Zafman LLP

(57) ABSTRACT

Methods and apparatuses for generating a low dynamic range image for a high dynamic range scene. In one aspect, a method to generate a low dynamic range image from a high dynamic range image, includes: determining one or more regions of the high dynamic range image containing pixels having values that are outside a first range and inside a second range; computing a weight distribution from the one or more regions; and generating the low dynamic range image from the high dynamic range image using the weight distribution. In another aspect, a method of image processing, includes: detecting one or more regions in a first image of a high dynamic range scene according to a threshold to generate a mask; and blending the first image and a second image of the scene to generate a third image using the mask.

8 Claims, 10 Drawing Sheets

OTHER PUBLICATIONS

Mark D. Fairchild, et al. "Image Appearance Modeling". SPIE/IS&T Electronic Imaging. 2003.

Fredo Durand, et al. "Fast Bilateral Filtering for the Display of High-Dynamic-Range Images". SIGGRAPH 2002.

K. Chiu, et al. "Spatially Nonuniform Scaling Function for High Contrast Images". Proceedings of Graphics Interface 99, May 1993.

Mark D. Fairchild, et al. "Meet iCAM: A Next-Generation Color Appearance Model". IS&T/SID 10th Color Imaging Conference, Scottsdale, pp. 33-40, 2002.

Mark D. Fairchild, et al. "Meet iCAM Framework for Image Appearance, Image Differences, and Image Quality". Journal of Electronic Imaging, 2004.

Garrett M. Johnson, et al. "Measuring Images: Differences, Quality, and Appearance". SPIE/IS&T Electronic Imaging Conference. SPIE Vol. 5007. Santa Clara 2003.

Raanan Fattal, et al. "Gradient Domain High Dynamic Range Compression". ACM Transactions on Graphics. Jul. 2002.

Nathan Moroney, et al. "A Comparison of Retinex and iCAM for Scene Rendering". J. of. Electronic Imaging, Jan. 2004, Received Feb. 2003, Revised Sep. 2003 and Accepted Sep. 2003.

OpenEXR, Using EXRdisplay. "Rendering More Detail in OpenEXR Images". www.openexr.org. Nov. 2004.

Erik Reinhard, et al. "Photographic Tone Reproduction for Digital Images". ACM Transactions on Graphics. Jul. 2002.

Gregory Ward Larson, et al. "A Visibility Matching Tone Reproduction Operator for High Dynamic Range Scenes". IEEE Transactions on Visualization and Computer Graphics, Vol. 3, No. 4, Oct.-Dec. 1997.

Ron Kimmel, et al "A Variational Framework for Retinex". Hewlett-Packard Laboratories. SPIE Electronic Imaging, San Jose, CA. Vol. 4672, Jan. 2002.

* cited by examiner

225 ⇩ Determine a region that reaches a threshold

229 ⇩ Blur the region to generate a weight function

METHODS AND APPARATUSES FOR IMAGE PROCESSING

TECHNOLOGY FIELD

At least some embodiments of the present invention relate to high dynamic range imaging, and more particular to presenting high dynamic range scenes in low dynamic range images.

BACKGROUND

Dynamic range shows the ratio of a specified maximum level of a parameter to the minimum detectable value of that parameter. High dynamic range imaging allows a greater dynamic range of exposures than normal digital imaging techniques. For example, a high dynamic range image can accurately represent the wide range of intensity levels found in real scenes, ranging from direct sunlight to the dark shadows, which may exceed the ratio of 10000 to 1.

A high dynamic range scene can be captured through a set of differently exposed photographs of the scene. Through changing the exposure duration, details in different portions of the high dynamic range can be captured in the differently exposed photographs.

For example, a typical digital camera has a limited dynamic range. With a given exposure setting, the digital camera may not be able to capture the details in a very bright area in the scene, since the bright area in the picture taken by the digital camera is saturated and represented as a nearly uniform white region. This situation becomes worse when the digital image is coded with 8 bits per channel as in JPEG or TIFF files. Similarly, the details in a very dark area in the scene may be captured as a nearly uniform black region. Different exposure durations allow the limited dynamic range of the digital camera to capture different ranges of the scene. Reducing the exposure duration can increase the captured details in the bright region; and increasing the exposure duration can increase the captured details in the dark region. When a number of images of a same scene are taken with different exposure durations, the high dynamic radiance range of the scene can be recovered in a high dynamic range image.

Paul E. Debevec and Jitendar Malik (Recovering high dynamic range radiance maps from photographs, Proc. of SIGGRAPH 97, Computer Graphics Proceedings, Annual Conference Series, pp. 369-378, 1997), presents a method to derive a response curve that relates the pixel image values and the natural logarithm of the product of irradiance and exposure duration. The response curve can then be used to recover high dynamic range radiance maps from series of images of a same scene taken at different exposure levels. In one example, Paul E. Debevec and Jitendar Malik map the logarithm of the radiance values into a gray scale image, which presents all the information in the series of images taken at the different exposure levels.

Photographers who use "wet" darkroom techniques produce improved images using known procedures such as "dodging" and/or "burning" when exposing a print to a negative through a conventional photographer's enlarger. In the "wet" darkroom, some light can be withheld in a process referred to as "dodging" from a portion of the print using a small wand during exposure of the print; and more light can be added to a portion of the print using a piece of paper with a hole for "burning" during the exposure of the print. Through selectively changing the amount of light used during the development process, a photographer can selectively lighten or darken different regions of the print. Also see, "Photographic Tone Reproduction for Digital Images", Reinhard, et al., ACM Transactions on Graphics, 21(3), pp 267-276, July 2002 (Proceedings of SIGGRAPH 2002).

However, producing a high dynamic range image for display or printing often requires an output device, such as a CRT or LCD display or a color printer, to also be able to provide a high dynamic range output. Unfortunately, many existing displays or printers do not provide a high dynamic range output.

SUMMARY OF THE DESCRIPTION

Methods and apparatuses for generating a low dynamic range image for a high dynamic range scene are described here. The low dynamic range image, once generated, can then be displayed or printed on an output device which has a low dynamic range. In one embodiment, the low dynamic range image is an image that has a lower dynamic range than a high dynamic range image and that includes a fair amount of details from the highlight and the shadow regions of the high dynamic range image. Some embodiments of the present invention are summarized in this section.

In one aspect of an embodiment of the present invention, a method to generate a low dynamic range image from a high dynamic range image, includes: determining one or more regions of the high dynamic range image containing pixels having values that are outside a first range and inside a second range; computing a weight distribution according to the one or more regions; and generating the low dynamic range image from the high dynamic range image using the weight distribution.

In one example of the aspect, a mask is generated to show the one or more regions; and the weight distribution is computed from blurring the mask.

In one example of the aspect, generating the low dynamic range image includes: mapping the first range of the high dynamic range image as a first image; mapping the second range of the high dynamic range image as a second image; and combining the first and second images using the weight distribution to generate the low dynamic range image. In one example, the first and second images are blended according to the weight function to generate the low dynamic range image. In one example, pixels having values outside the first range in the high dynamic range image are clamped according to the first range in the first image.

In one example of the aspect, two non-overlapping portions of the first and second ranges of the high dynamic range image correspond to two overlapping ranges in the low dynamic range image.

In another example of the aspect, non-overlapping portions of the first and second ranges of the high dynamic range image correspond to non-overlapping ranges in the low dynamic range image.

In one aspect of an embodiment of the present invention, a method of image processing, includes: detecting one or more regions in a first image of a high dynamic range scene according to a threshold to generate a mask; and blending the first image and a second image of the scene to generate a third image using the mask.

In one example of the aspect, a weight distribution is generated from the mask; and the first and second images are blended according to the weight distribution.

In one example of the aspect, the first and second images are taken from a same scene using different exposure settings. In another example of the aspect, the first and second images are low dynamic images derived from a high dynamic image.

In one example of the aspect, the first and second images are scaled into a first and second target pixel value ranges. The first and second target pixel value ranges are partially overlapping. An overlapping portion of the first and second target pixel value ranges corresponds to different ranges of radiance of a same scene captured by the first and second images.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

In one embodiment of the present invention, details in different ranges and different regions of a high dynamic range scene are blended into a composite image with a lower dynamic range suitable for a low dynamic range device (e.g., a monitor or a printer).

Figure 1:
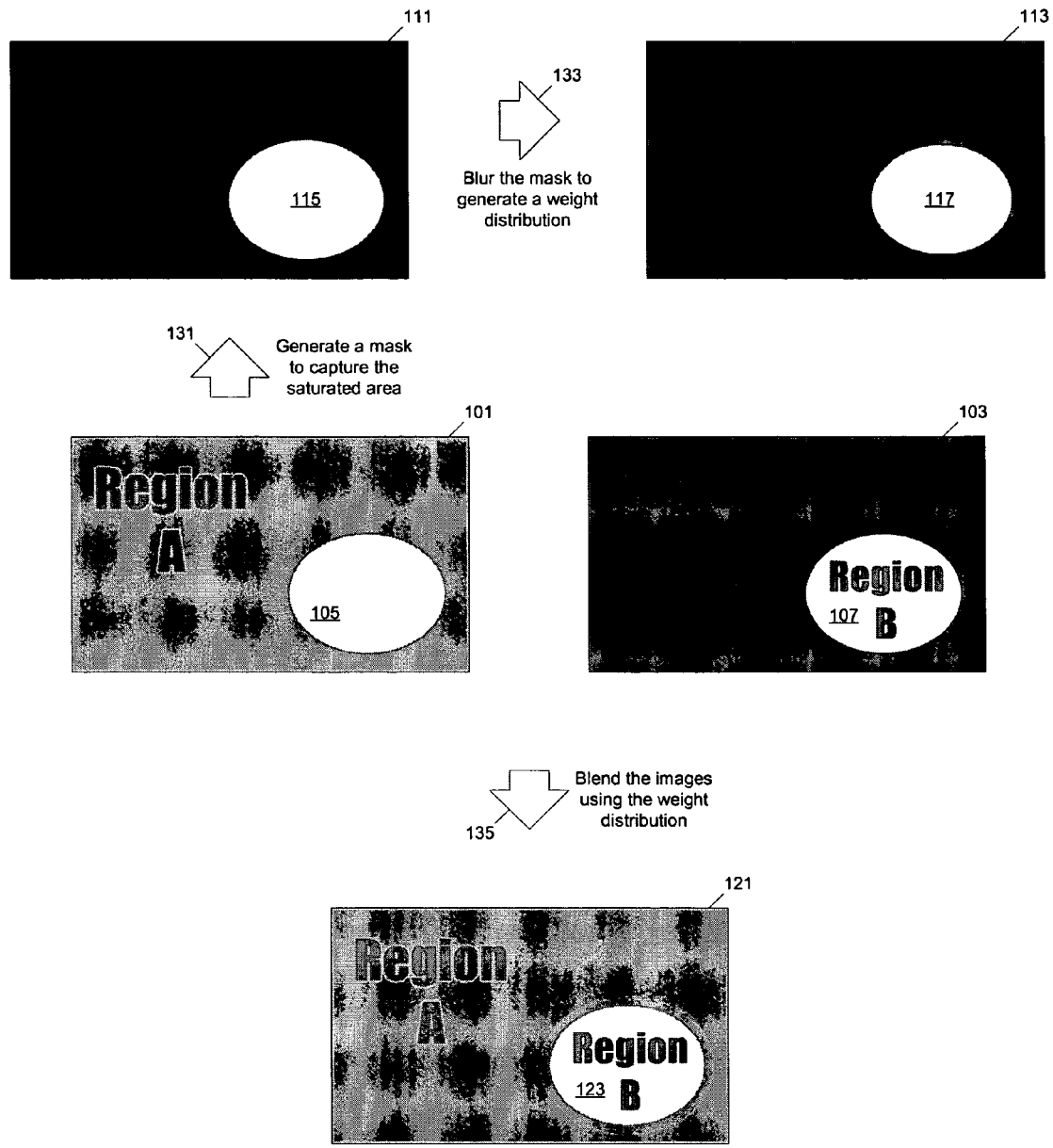
FIG. 1 illustrates a method to combine low dynamic range images of a high dynamic range scene to generate a low dynamic range image representative of the high dynamic range scene according to one embodiment of the present invention.

FIG. 1 illustrates a method to combine low dynamic range images of a high dynamic range scene to generate a low dynamic range image representative of the high dynamic range scene according to one embodiment of the present invention.

In FIG. 1, low dynamic range images (101 and 103) capture the details in different ranges and in different regions of a scene. For example, the high exposure image (101) has a region (105) which corresponds to a high radiance region and is saturated. The details in the high radiance region (105) in the high exposure image (101) are not recognizable. However, the details in the region outside the high radiance region (105) are well captured in the high exposure image (101).

On the other hand, the details in the high radiance region (107) are well captured in the low exposure image (103). However, the details in the low radiance regions outside the high radiance region (107) are not recognizable in the low exposure image (103). In a typical example which includes images such as images 101 and 103, the image 101 captures more light than the image 103 (e.g., image 101 is taken at f/2 for 1/30 of a second while image 103 is taken at f/8 for 1/30 of a second; or image 101 is taken at f/4 for 1/30 of a second while image 103 is taken at f/4 for 1/60 of a second).

In one embodiment of the present invention, the low dynamic range images (101 and 103) are blended into one image (121) which provides more recognizable details in a single image. When an observer looks into different regions, his visual system adapts to the local radiance level. Since the blended image (121) presents local details according to the local radiance level, viewing different portions of the image (121) provides an experience similar as an observer looks into different portions of the high dynamic range scene.

In one embodiment of the present invention, the low dynamic range images are blended according to a weight distribution (113) which based on the distribution of different ranges in different locations in the scene and this blending and the calculation of the weight distributions may be performed automatically (e.g., by a computer or camera or other data processing system).

For example, in one embodiment, a mask (111) is generated (131) from the high exposure image (101) to capture the saturated area which can be better represented by the corresponding portion of the low exposure image (103). The mask (111) shows a region (115) corresponding to the saturated area (105) of the high exposure image (101). The mask (111) can be used directly to insert the details from the corresponding region in the low exposure image (103) into the corresponding region in the high exposure image (101). Alternatively, to provide a transition and avoid abrupt changes, the mask (111) is blurred (133) to generate the weight distribution (113). Inside the region (117), the weight distribution has heavier weight for the low exposure image (103) and lighter weight for the high exposure image (101); outside the region (117), the weight distribution has lighter weight for the low exposure image (103) and heavier weight for the high exposure image (101); and the weight transitions smoothly in between. Thus, when the low dynamic range images (101 and 103) are blended (135) using the weight distribution (113) into the blended image (121), the details captured in the region (107) of the low exposure image (103) are shown in the region (123) of the blended image (121) and the details captured outside the region (105) of the high exposure image (101) shown outside the region (123) of the blended image (121).

In FIG. 1, the processing may also start with the low exposure image (103) to determine a mask for the region where details of the scene are not well captured due to the limitation on dynamic range. The mask generated from the low exposure image may appear to be similar to the mask (111) generated from the high exposure image (101). The mask generated from the low exposure image can be blurred to generate a weight distribution to blend the details captured in the high exposure image into the dark region of the low exposure image.

In one embodiment of the present invention, more than two images can be blended into a resulting image in a similar way. For example, a first image of one exposure setting can be examined to determine the dark regions and bright regions where the details may not be well captured under the exposure setting. For example, the bright regions and the dark regions may be the regions with pixels having pixel values reaching the upper or lower saturation values, or within a threshold away from the saturated values (e.g., larger than 95% of the upper saturation value or less than 5% of the lower saturation value).

A second image having an exposure setting higher than the first image can be used to capture the details in the dark regions. The mask showing the dark regions can be blurred to generate the weight distribution to blend the details captured in the second image into the dark regions of the first image. Similarly, a third image having an exposure setting lower than the first image can be used to capture the details in the bright region; and the weight distribution generated according to the shape of the bright region can be used to blend the details captured in the third image into the bright region of the first image.

Further, the second image may have dark regions, within which details can be further captured using a fourth image that has a exposure setting higher than the second image. Thus, the details captured in the fourth image can be blended into the resulting image using the mask showing the dark regions of the second image. Similarly, the third image may have bright regions, within which details can be further captured using a fifth image that has a exposure setting lower than the third image; and the details captured in the fifth image can be blended into the resulting image using the mask showing the bright regions of the third image.

Thus, different exposure settings can be used to capture details in different ranges, which are typically in different regions of the scene. In one embodiment of the present invention, the shape of the regions are used to derive the weight distributions, which are used to blend the details captured in different regions and different ranges into the resulting image. In such a way, visible details in various regions of the high dynamic range scene are captured in the resulting low dynamic range image.

The resulting image allows an observer to look at a particular region to obtain the details in that region. The resulting image provides a similar viewing experience as the original high dynamic range scene.

In one embodiment of the present invention, the mapping from the radiance in the scene to the pixel values in the resulting image is monotonic. Thus, the overall look and feel of the high dynamic range scene is preserved in the resulting low dynamic range image. For example, when blending the details captured in the first image and the details captured in the second image, the pixel values of the first and second images can be scaled so that in the blended image the pixel values in the region corresponding to the dark region of the first image, which takes the details from the corresponding region in the second image, has pixel values lower than the pixel values in other regions that are brighter than the dark region in the first image.

In one embodiment of the present invention, the mapping from the radiance in the scene to the pixel values in the resulting image is not monotonic. For example, when blending the details captured in the first image and the details captured in the second image, pixels of the resulting image showing the details captured in the first image and pixels of the resulting image showing the details captured in the second image may be in the same pixel value range, even though in the high dynamic range scene the details captured in the first and second image are in different radiance ranges. Such an arrangement in the resulting image may change the overall look and feel of the scene. However, using a portion of pixel value range to map the details of different radiance range can expand the pixel value ranges available to show the details. Thus, the details in first and second resulting images in different ranges of radiances can be better presented in the resulting low dynamic range image.

In one embodiment of the present invention, the tradeoff between showing the overall look and feel of the global differences in radiance ranges in different regions and showing the details in different regions in different ranges of radiance ranges can be made through adjusting the degree of overlapping in the pixel value ranges in the corresponding regions of the resulting low dynamic range image.

FIGS. 2-6 illustrate methods to render a high dynamic range image into a low dynamic range image according to one embodiment of the present invention. In FIGS. 2-6, distributions along a line in the images are illustrated. From the illustration along the line in the image, a person skilled in the art can see the processing for the two dimensional array of pixels.

Figure 2:
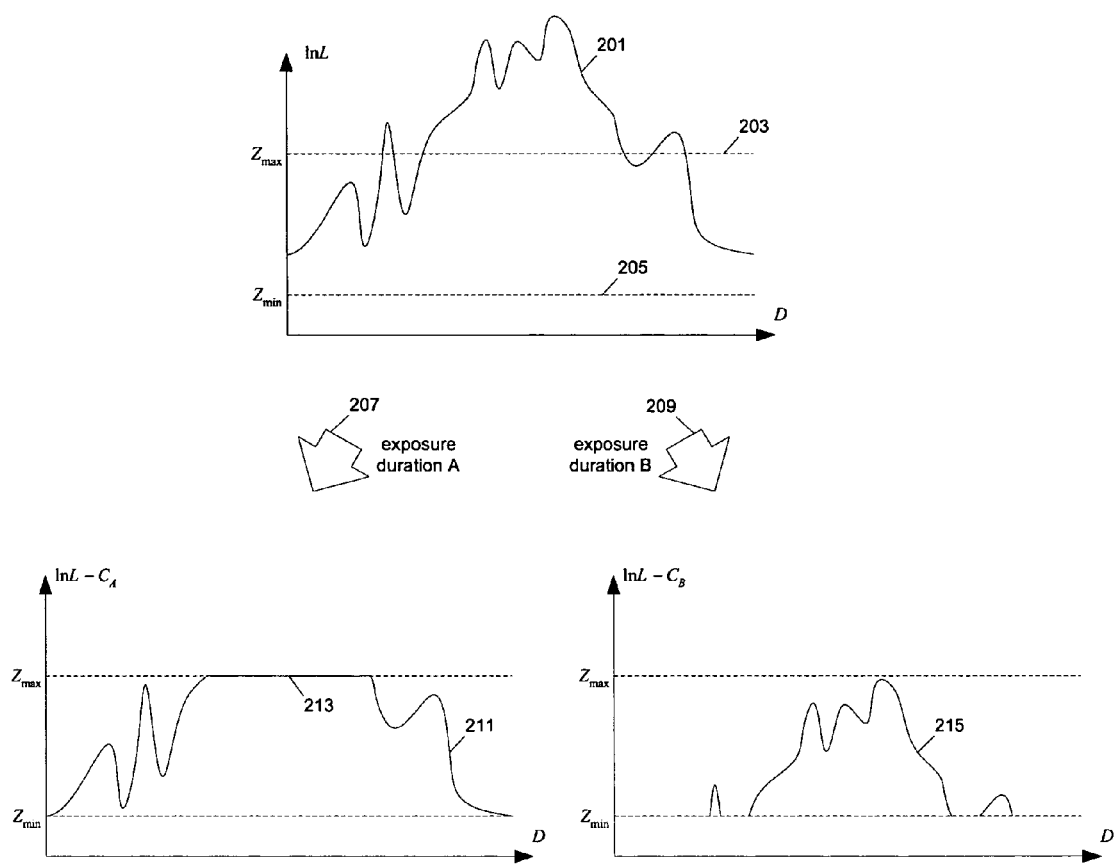
FIGS. 2-6 illustrate methods to render a high dynamic range image into a low dynamic range image according to one embodiment of the present invention.

In FIG. 2, the distribution of logarithm of radiance (201) is shown. A high dynamic range image typically includes information to show the distribution of radiance in the array of pixels. The range of the radiance is typically much high than the available range for a display or a print. For example, in FIG. 2, the available dynamic range for a display device may correspond to the range between $Z_{min}$ (205) and $Z_{max}$ (203). The low dynamic range $[Z_{min}, Z_{max}]$ can accommodate only a portion of the range of radiance of the high dynamic range image (201).

Using different exposure settings, different portions of the radiance of the high dynamic range image can be captured. For example, using a high exposure setting, a lower portion of the radiance distribution is captured (207) as the distribution (211), which has a portion (213) saturated at the upper limit $Z_{max}$. Similarly, when a low exposure setting is used, a higher portion of the radiance distribution is captured (209) as the distribution (215), which has a portion saturated at the lower limit $Z_{min}$.

Although FIG. 2 shows capturing of details in portions of the entire dynamic range of the original image through a line mapping, it is understood that in general nonlinear mapping can also be used. A typical photographing process typically involves a nonlinear mapping g such that $g(Z) = \ln E + \ln t$ where E is irradiance which is proportional to the radiance L; t is the exposure duration; and Z is the pixel value.

Thus, in general, a liner or nonlinear mapping g can be used to capture a portion of the dynamic range of the high dynamic range image (e.g., 201) to generate a low dynamic range image (e.g., 211 or 215), in a way similar to taking a picture of the high dynamic range scene.

It is seen that different exposure settings lead to different detail visibility in different portions of the high dynamic range image. In one embodiment of the present invention, details in different ranges of the high dynamic range image are blended into a low dynamic range to show the details in different regions in the same image.

Figure 3:
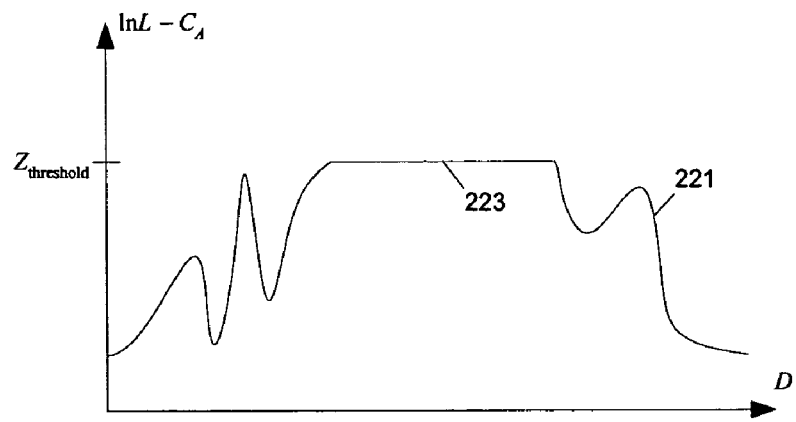
Figure 3:
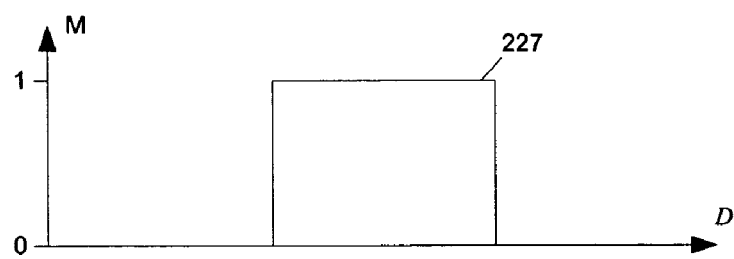
Figure 3:
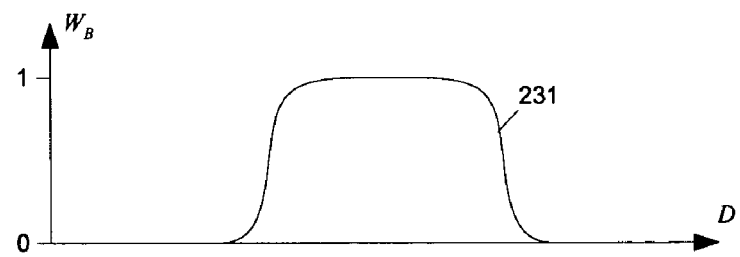

For example, in FIG. 3, a threshold value, $Z_{threshold}$, is used to determine the region for improvement based on the low dynamic range image (221). The threshold value can be a saturation value, such as $Z_{max}$, or a value close to $Z_{max}$ (e.g., 95% of $Z_{max}$). A region that reaches the threshold is then determined (225) to generate a mask (227). The mask (227) shows the region that reaches the threshold, in which the details of the original image is not well captured and improvement can be performed through blending the details from a higher portion of range of the original image.

To provide a smooth transition, the mask (227) can be used to generate a smooth weight function. For example, the mask 227 showing the region can be blurred (229) to generate the weight function (231) through a typically Gaussian blur operation of image processing. The weight function allows a blending process to preserve the details of the distribution (221) outside the detected region that reaches the threshold and to fill the detected region with details from a different range of the high dynamic range image.

Figure 4:
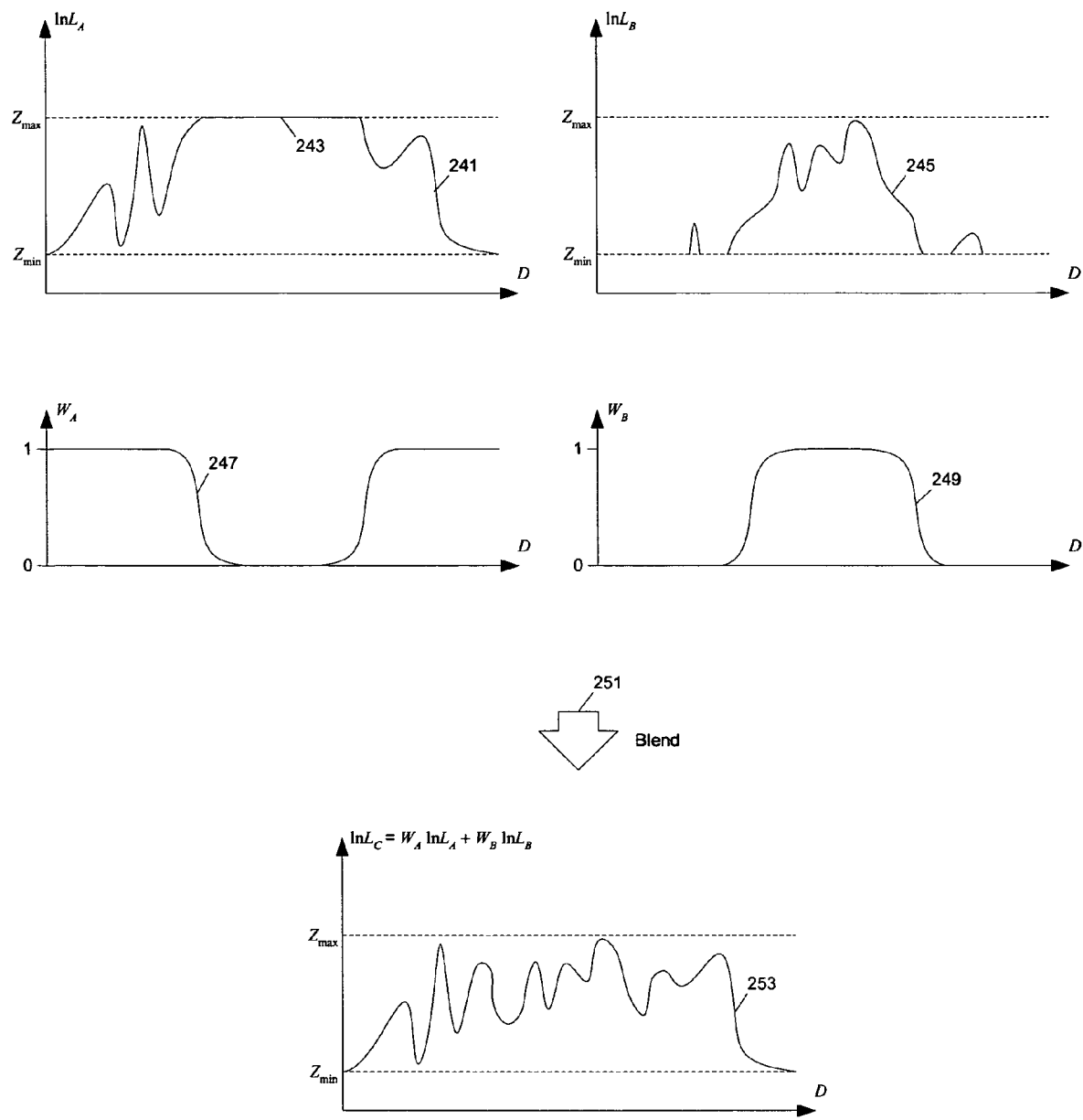

For example, in FIG. 4, different ranges of the high dynamic range image are captured as low dynamic range images (241 and 245), which have radiances LA and LB respectively. It is seen that the image (241) has a region (243) which is saturated to the upper limit ($Z_{max}$) and can be enhanced with the details captured in the corresponding region in the image (245). The weight distribution (249) can be derived from blurring the region that reaches $Z_{max}$; and the weight distribution (247) is compliment to the weight distribution (249) such that $W_A=1-W_B$. Blending (251) the images (241 and 245) using the weight distributions (247 and 249) leads to the resulting image (253) which shows the details in regions both inside and outside the region corresponding to the saturated region (243) of the image (241).

When the low dynamic range image (253) in FIG. 4 is compared to the high dynamic range image (201) in FIG. 4, it is seen that the overall look or feel is altered, since information in different ranges in the high dynamic range image is mapped into the same range of the low dynamic range image. However, the local details are well preserved in various regions of the low dynamic range image.

To preserve the look and feel of the overall image, details from different ranges of the dynamic range image can be mapped to different ranges of the low dynamic range image.

Figure 5:
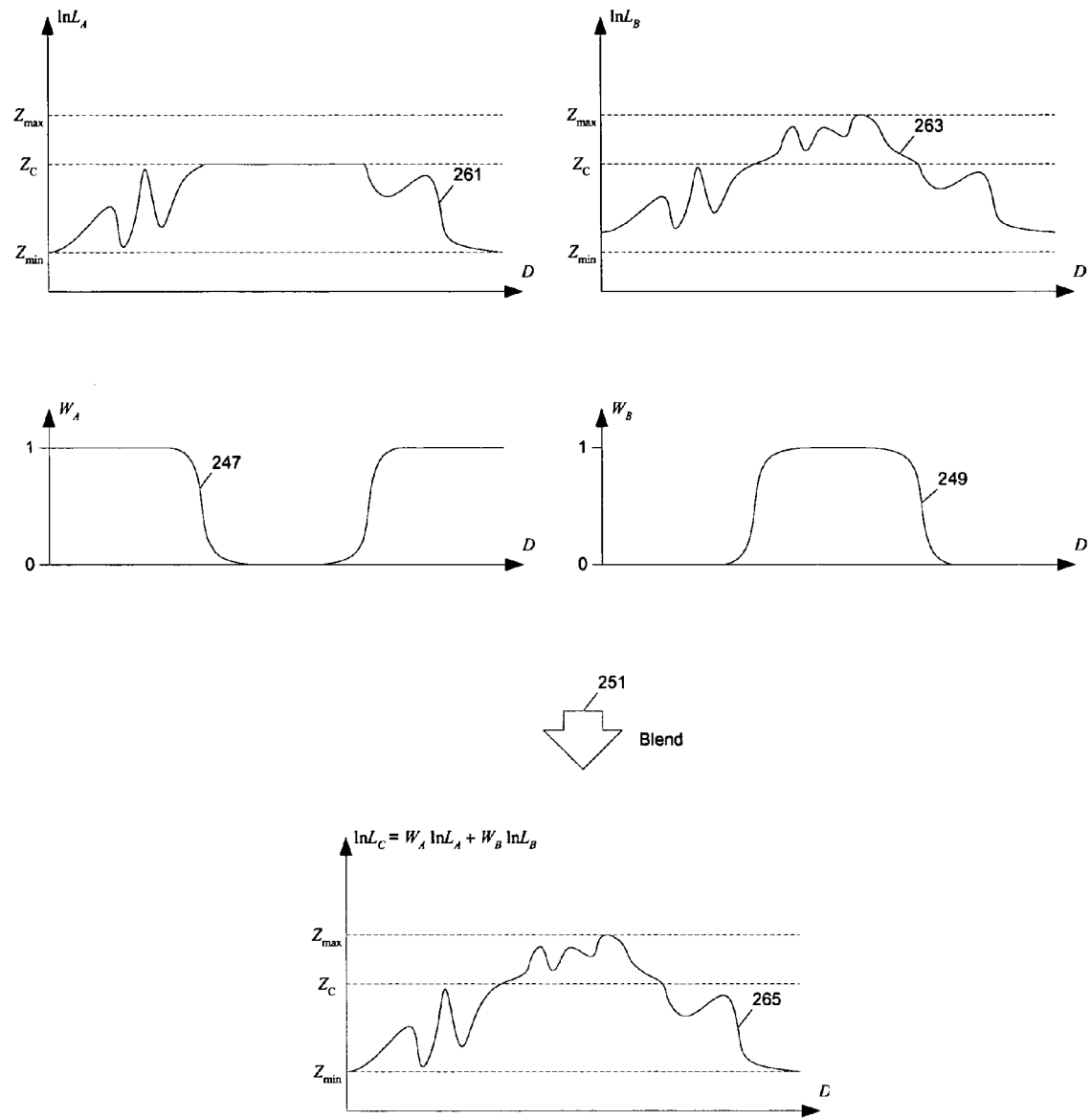

For example, in FIG. 5, the image (241) of FIG. 4 is scaled to occupy only a portion of the target low dynamic range. For example, a linear scaling can be performed so that the image (261) uses the range [$Z_{min}$, $Z_c$] instead of [$Z_{min}$, $Z_{max}$]. Similarly, the scaling can be performed so that the information in a range above that captured in the image (261) is in the range of [$Z_C$, $Z_{min}$] in image 263.

After the images (261 and 263) are blended (251) using the weight distributions (247 and 249), the resulting image (265) shows the overall look and feel of the high dynamic range image.

In general, a tradeoff between the global look and feel and the visibility of local details can be balanced through the partial overlapping the target ranges mapped from non-overlapping ranges of the high dynamic range image.

Figure 6:
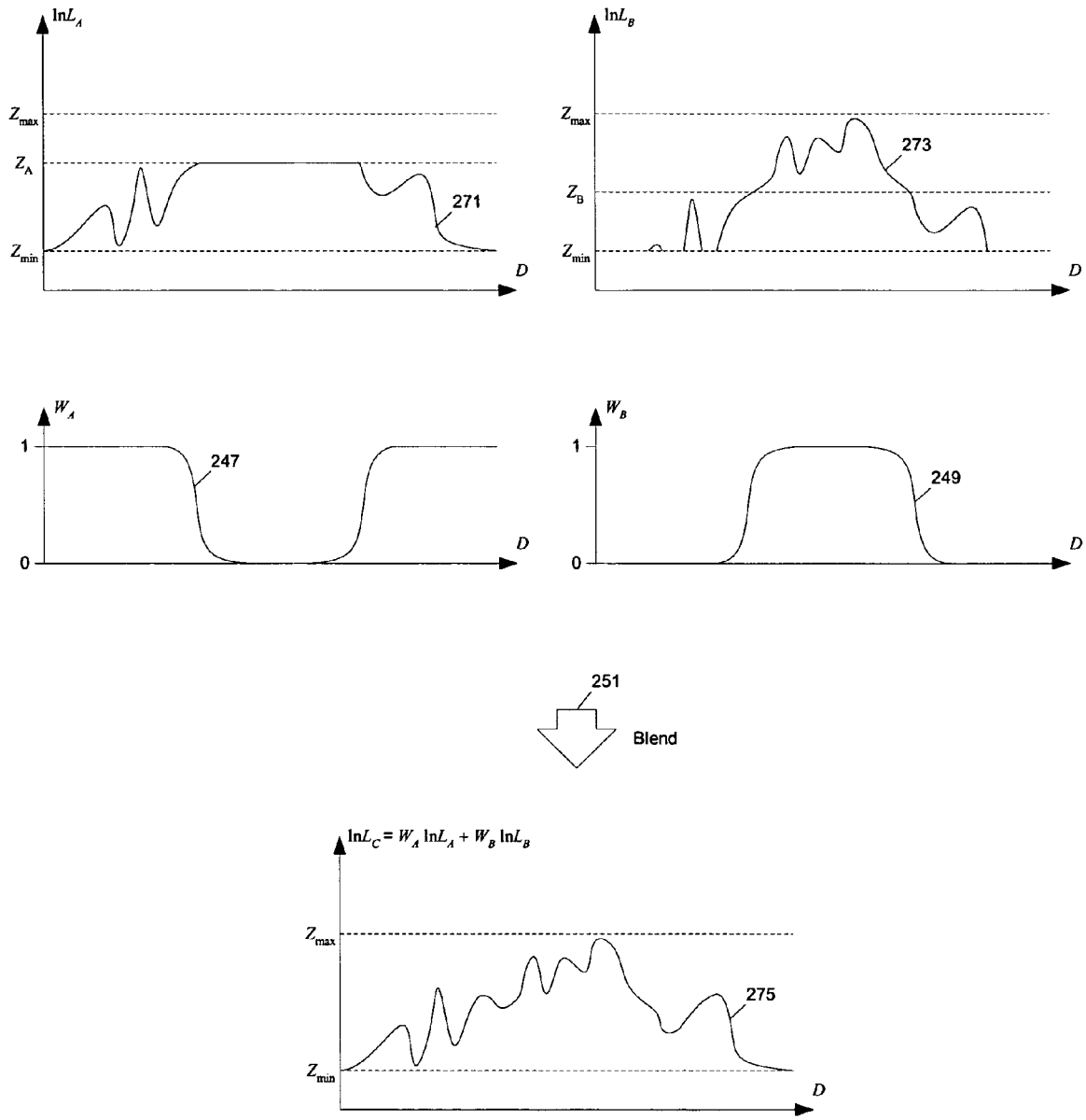

For example, in FIG. 6, the details from one range of the original image are mapped into the target range [$Z_{min}$, $Z_A$] in the image (271); and the details from another range of the original image, which is high than that represented by the image (271), are mapped into the target range [$Z_B$, $Z_{max}$] in the image (273). The ranges [$Z_{min}$, $Z_A$] and [$Z_B$, $Z_{max}$] partially overlap with each other. The less the overlapping, the better the overall look and feel is, but the less recognizable local details. When the overlapping increases, the ranges available to show the details in each of images (271 and 273) increase, which leads to better rendering of local details. The images (271 and 273) can then be blended (251) using the weight distributions (247 and 249) into the resulting low dynamic range image (275), which provides the tradeoff between the overall look and feel and the visibility of local details.

In general, it is not necessary to create the intermediate low dynamic range images, such as images (271 and 273), to generate the resulting low dynamic range image, such as the image (275). The information showing in the intermediate low dynamic range images, such as images (271 and 273), are readily available from the high dynamic range image, which can be used to directly compute the weight distributions and generate the resulting low dynamic range image (275).

For example, the dynamic range of a high dynamic range image can be spliced into a plurality of source ranges, such as [$L_1$, $L_2$], [$L_2$, $L_3$], . . . , [$L_n$, $L_{n+1}$]. The regions corresponding to L>$L_2$, L>$L_3$, . . . , L>$L_n$ can be determined from the pixel values of the high dynamic range image. Masks $M_2$, $M_3$, . . . , $M_n$ corresponding to these regions can be blurred to generate the weight distributions $W_2$, $W_3$, . . . , $W_n$ respectively. The details in the plurality of source ranges can be mapped into corresponding target ranges [$Z_{1l}$, $Z_{1u}$], [$Z_{2l}$, $Z_{2u}$], . . . , [$Z_{nl}$, $Z_{nu}$] through mappings $h_1$, $h_2$, . . . , $h_n$. Typically, the mappings $h_1$, $h_2$, . . . , $h_n$ are of the same type (e.g., linear mapping for logarithm of radiance). However, different types of mappings can also be used for different source ranges. The target ranges [$Z_{1l}$, $Z_{1u}$], [$Z_{2l}$, $Z_{2u}$], . . . , [$Z_{nl}$, $Z_{nu}$] may be the same (e.g., [$Z_{min}$, $Z_{max}$]) to emphasis the visibility of details in each of the source ranges, or partially overlapping to balance the overall look and feel and the visibility of local details. In one embodiment, weighted averages of the target ranges (e.g., weighted according to the pixels in the corresponding regions) increase monotonically to show the overall look and feel of brightness in various regions in the scene. Alternatively, the source ranges are monotonically mapped into the target range [$Z_{min}$, $Z_{max}$] to emphasis the overall look and feel.

The resulting low dynamic range can be expressed as:

$$h_n(L) \times W_n + (1-W_n) \times (h_{n-1}(L) \times W_{n-1} + (1-W_{n-1}) \times (\ldots + (1-W_2) \times h_1(L)))$$

where L is the radiance of the high dynamic range image.
Alternatively, an iterative process can be used. For example, $$Z_2 = h_1(L) \times (1-W_2) + h_2(L) \times W_2$$

$$Z_i = Z_{i-1} \times (1-W_i) + h_i(L) \times W_i$$

where i=3, . . . , n.

In one embodiment of the present invention, the process starts with the mid-tone range. Details in the bright regions and dark regions are then blended in using the weight functions derived from the shape of the bright regions and dark regions.

In one embodiment of the present invention, the entire radiance range of the high dynamic range image is segmented into more than two source ranges. Combining the details from different source ranges in different regions into a final low dynamic range image, which has the appearance of a high dynamic range image, can be performed in one step or in multiple steps (e.g., using the above direct expression or the above expressions for the iterative process). When one step is used to combine the details, information from N segments of the entire dynamic range of the high dynamic range image is determined and mixed based on N−1 masks. When multiple steps are used, more details captured in adjacent range segments can be mixed into an image that is initially based on a selected range segment (e.g., a mid tone segment), until the information from a desirable portion of the entire dynamic range of the original image is covered. For example, the details from adjacent range segments can be mixed in to the image one at a time, until the saturated regions in the image are small enough such that one can ignore the details within the saturated regions.

Figure 7:
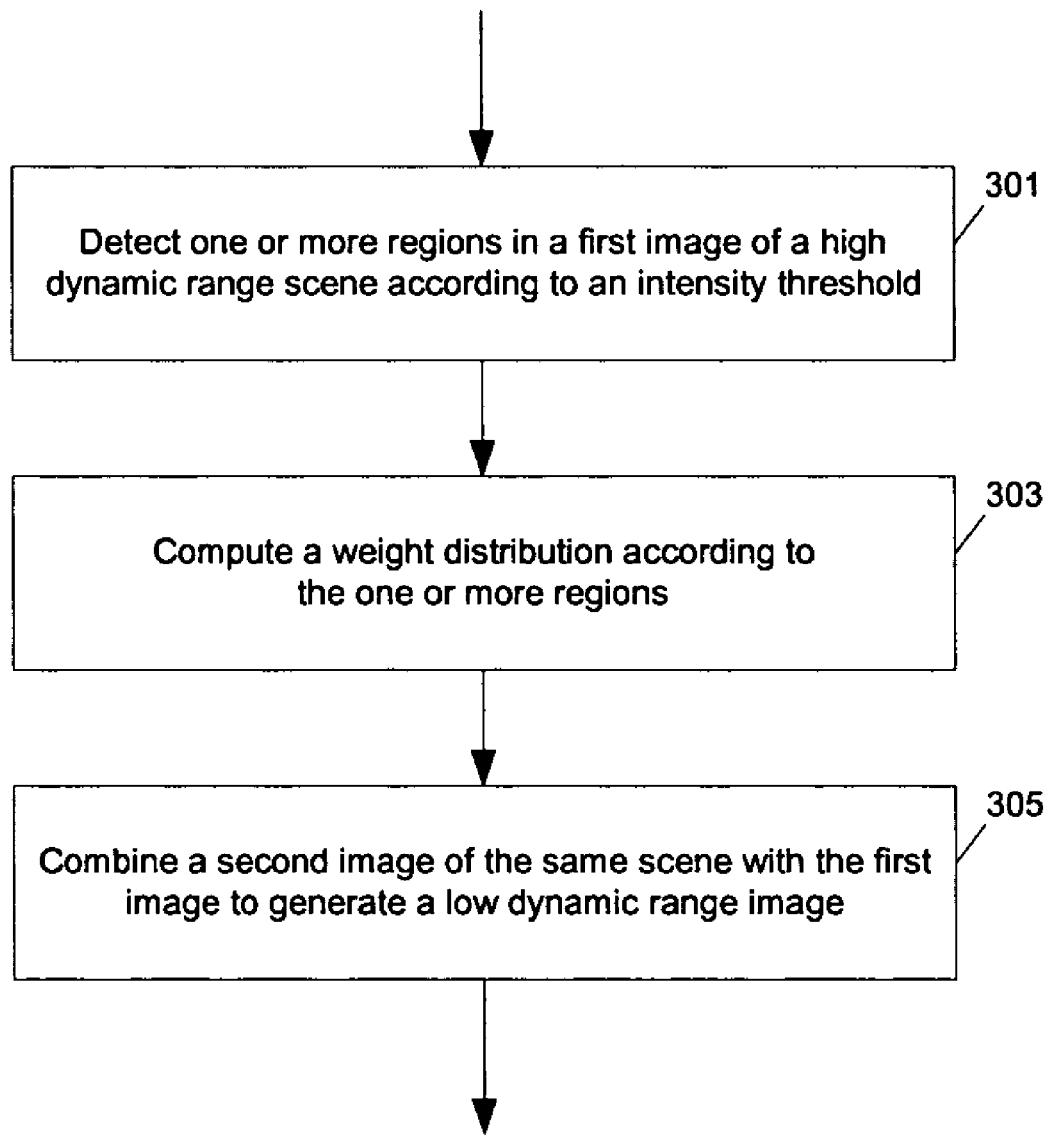
FIG. 7 shows a method to generate a low dynamic range image for a dynamic range scene according to one embodiment of the present invention.

FIG. 7 shows a method to generate a low dynamic range image for a dynamic range scene according to one embodiment of the present invention. Operation 301 detects one or more regions in a first image of a high dynamic range scene according to an intensity threshold. Operation 303 computes a weight distribution according to the one or more regions. Operation 305 combines a second image of the same scene with the first image to generate a low dynamic range image. The weight distribution allows the content within the one or more regions to be replaced with the content in the corresponding regions of the second image. Thus, details captured with different exposure settings in different portions of a high dynamic range scene can be merged into one low dynamic image. The first and second images may be directly obtained from a digital camera. Alternatively, the first and second images may be constructed from a high dynamic range image.

Figure 8:
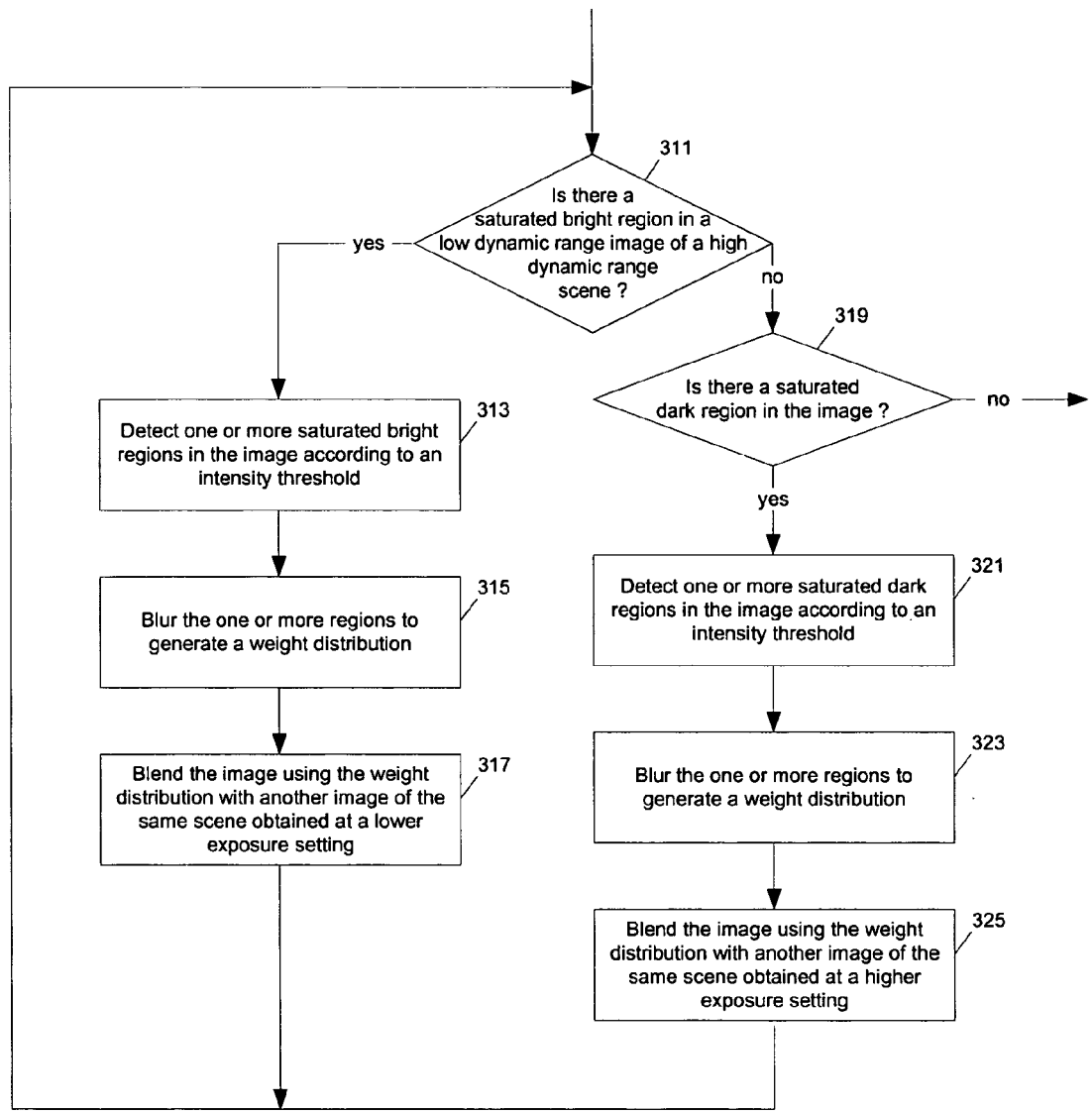
FIG. 8 shows a method to generate a low dynamic range image for a dynamic range scene according to one embodiment of the present invention.

FIG. 8 shows a method to generate a low dynamic range image for a dynamic range scene according to one embodiment of the present invention. In FIG. 8, if operation 311 determines that there is a saturated bright region in a low dynamic range image of a high dynamic range scene, operation 313 detects one or more saturated bright regions in the image according to an intensity threshold. The bright regions with pixels having pixel values above the threshold are considered as saturated regions. Operation 315 blurs the one or more regions to generate a weight distribution. Operation 317 blends the image, using the weight distribution, with another image of the same scene obtained at a lower exposure setting. Note that the lower exposure setting may not be able to capture all details in the bright region. After the details captured in the image with the lower exposure setting is blended into the low dynamic range image, the low dynamic range image may still have one or more saturated bright regions within the previously determined bright regions. Thus, operations 313-317 may be repeated for a further lower exposure setting.

If operation 319 determines that there is a saturated dark region in the image, operation 321 detects one or more saturated dark regions in the image according to an intensity threshold. The dark regions with pixels having pixel values below the threshold are considered as saturated regions. Operation 323 blurs the one or more regions to generate a weight distribution. Operation 325 blends the image using the weight distribution with another image of the same scene obtained at a higher exposure setting. Note that the higher exposure setting may not be able to capture all details in the dark region. After the details captured in the image with the higher exposure setting is blended into the low dynamic range image, the low dynamic range image may still have one or more saturated dark regions within the previously determined dark regions. Thus, operations 321-325 may be repeated for a further higher exposure setting.

Operations 311-325 can be repeated until there is no further saturated regions in the resulting low dynamic range image (or when the saturated regions are small enough).

Figure 9:
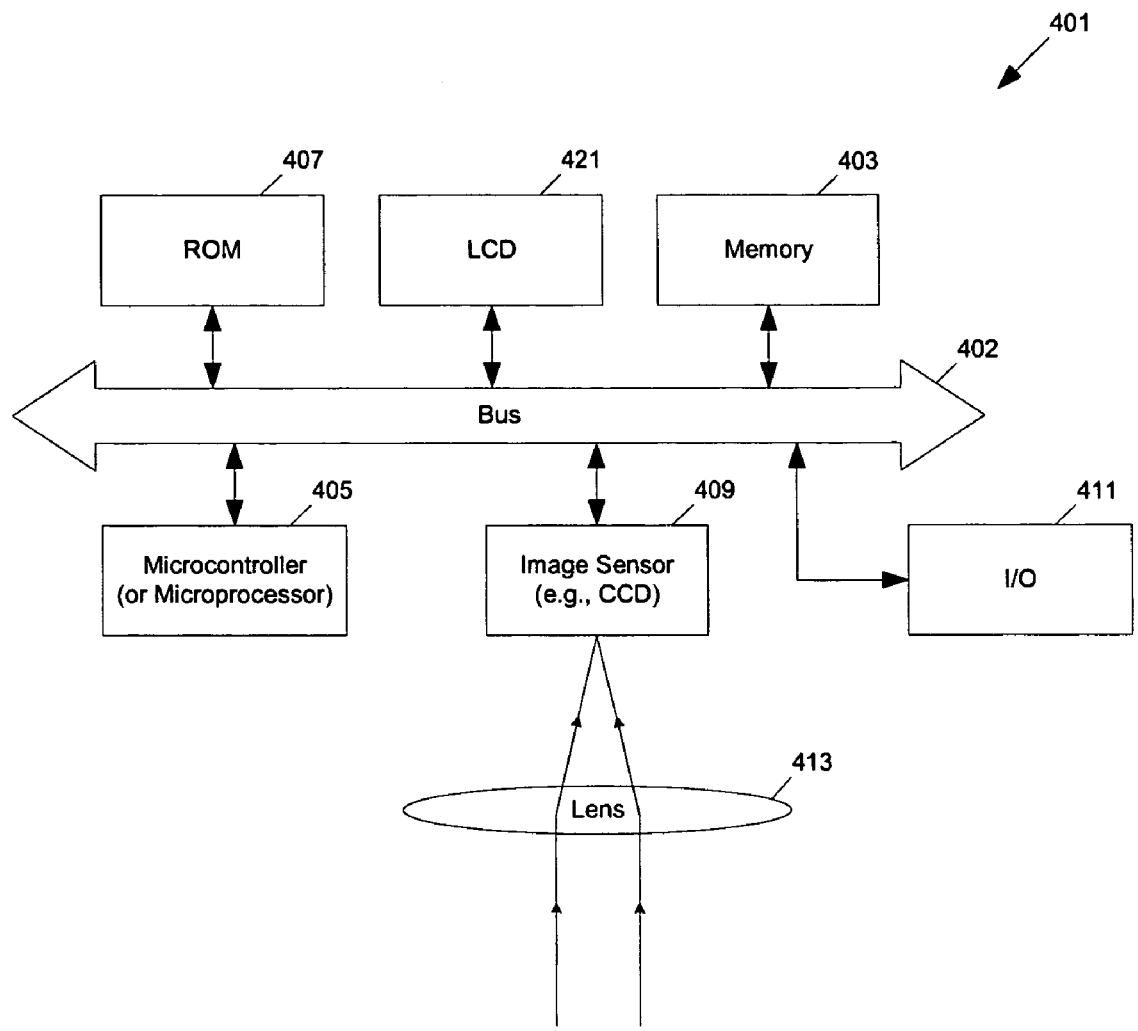
FIG. 9 shows an example of an image taking system which may be used in embodiments of the invention.

FIG. 9 shows an example of an image taking system which may be used in embodiments of the invention. This imaging device 401 may be, for example, a digital still or video (movie) camera. The imaging device 401 includes a microcontroller or microprocessor 405 which is coupled by a bus 402 to a memory 403, an Input/Output (I/O) port 411, a CCD (Charge Coupled Device) image sensor 409, and a ROM (Read Only Memory) 407. The imaging device 401 may also include a Liquid Crystal Display (LCD) 421, which is also coupled to the bus 402 and which may be used to display images which are captured or recorded by the imaging device 401. The LCD 421 serves as a viewfinder of a camera and there may optionally be other types of image display devices on imaging device 401 which can serve as a viewfinder.

The imaging device 401 also includes an imaging lens 413 which can be disposed over CCD 409. The microprocessor 405 controls the operation of the imaging device 401; and, it may do so by executing a software program stored in ROM 407, or in the microprocessor 405, or in both ROM 407 and the microprocessor 405.

The microprocessor 405 controls the image processing operation; and, it controls the storage of a captured image in memory 403. The microprocessor 405 also controls the exporting of image data (which may or may not be color corrected) to an external general purpose computer or special purpose computer through one of the I/O ports 411.

The microprocessor 405 also responds to user commands (e.g., a command to "take" a picture by capturing an image on the CCD and storing it in memory or a command to select an option for contrast enhancement and color balance adjustment).

The ROM 407 may store software instructions for execution by the microprocessor 405 to derive an exposure function and generate high dynamic range images from series of images with different exposure duration. The memory 403 is used to store captured/recorded images which are received from the CCD 409. It will be appreciated that other alternative architectures of a camera can be used with the various embodiments of the invention.

In one embodiment, the imaging device 401 has a housing (not shown in FIG. 9) and the lens 413 and LCD 421 are coupled to the housing. The microcontroller 405 and image sensor 409 are enclosed within the housing. In one embodiment, the ROM 407 and memory 403 are also enclosed within the housing.

In one embodiment, when the imaging device 401 is instructed to capture a high dynamic range image of a scene, a set of images are taken automatically with a number of different exposure durations. The microcontroller (405) then merges the set of images into one low image showing the details captured in the set of images for regions of different ranges. The user may select the option of preserving the global look and feel or presenting more details, or a degree of tradeoff between these two conflicting goals. The resulting low dynamic range image can then be displayed on the LCD 421.

In one embodiment, a high dynamic range image is also derived from the set of images. Examples and details of deriving a high dynamic range image from a plurality of images of different exposure settings can be found in a co-pending U.S. Patent Application, Ser. No. 11/058,770, entitled "Transfer Function and High Dynamic Range Images", filed on the same day with the present invention, which is hereby incorporated herein by reference.

In one embodiment, a software and/or hardware module is built into a printer to generate and print a low dynamic range image with a high dynamic range appearance when a high dynamic range image is received for printing.

Many of the methods of the present invention may be performed with a digital processing system, such as a conventional, general-purpose computer system. Special purpose computers, which are designed or programmed to perform only one function, may also be used.

Figure 10:
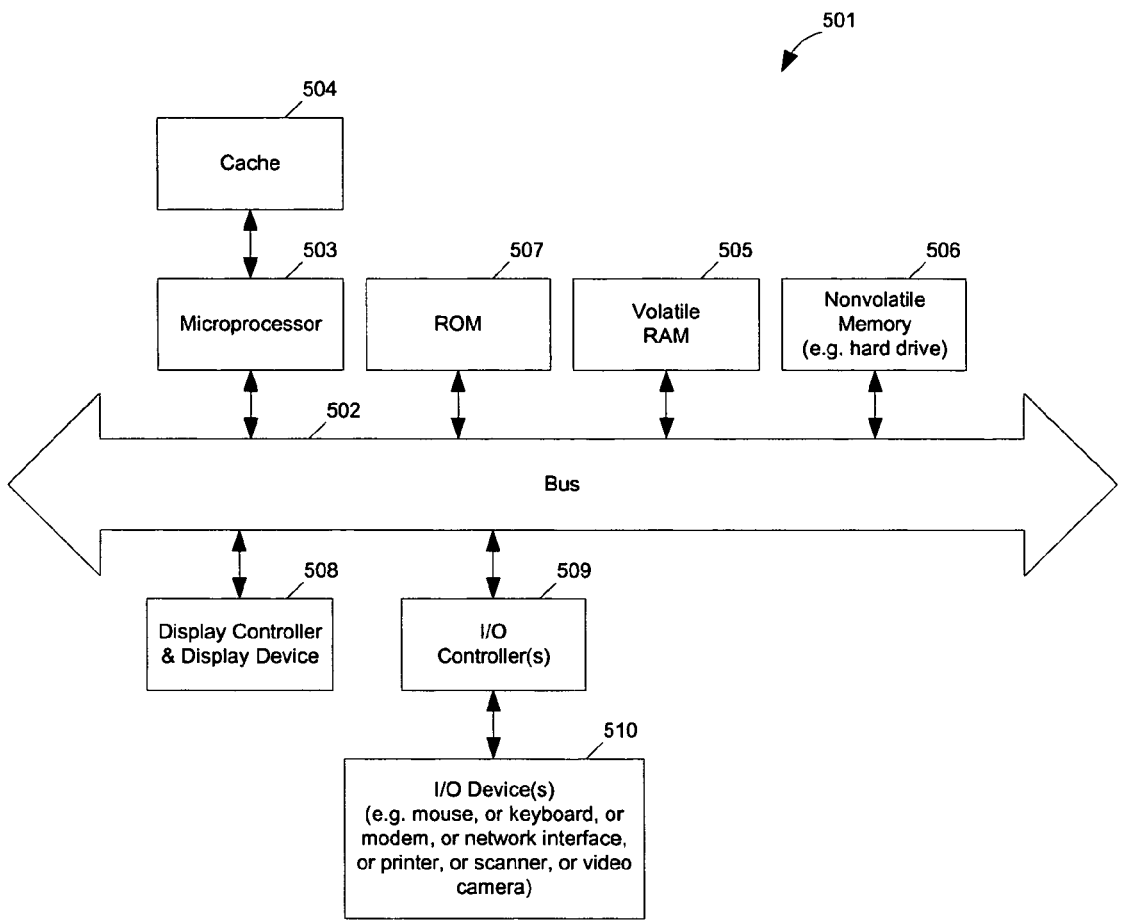
FIG. 10 shows a block diagram example of a data processing system which may be used with the present invention.

FIG. 10 shows one example of a typical computer system which may be used with the present invention. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 10 may, for example, be an Apple Macintosh computer.

As shown in FIG. 10, the computer system 501, which is a form of a data processing system, includes a bus 502 which is coupled to a microprocessor 503 and a ROM 507 and volatile RAM 505 and a non-volatile memory 506. The microprocessor 503, which may be, for example, a G3, G4, or G5 microprocessor from Motorola, Inc. or IBM is coupled to cache memory 504 as shown in the example of FIG. 10. The bus 502 interconnects these various components together and also interconnects these components 503, 507, 505, and 506 to a display controller and display device 508 and to peripheral devices such as input/output (I/O) devices which may be mice, keyboards, modems, network interfaces, printers, scanners, video cameras and other devices which are well known in the art. Typically, the input/output devices 510 are coupled to the system through input/output controllers 509. The volatile RAM 505 is typically implemented as dynamic RAM (DRAM) which requires power continually in order to refresh or maintain the data in the memory. The non-volatile memory 506 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 10 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers and/or adapters as is well known in the art. In one embodiment the I/O controller 509 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 507, volatile RAM 505, non-volatile memory 506, cache 504 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 503.

A machine readable medium can be used to store software and data which when executed by a data processing system causes the system to perform various methods of the present invention. This executable software and data may be stored in various places including for example ROM 507, volatile RAM 505, non-volatile memory 506 and/or cache 504 as shown in FIG. 10. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

The methods of the present invention can be implemented using dedicated hardware (e.g., using Field Programmable Gate Arrays, or Application Specific Integrated Circuit, which many be integrated with image sensors, such as CCD or CMOS based image sensors) or shared circuitry (e.g., microprocessors or microcontrollers under control of program instructions stored in a machine readable medium, such as memory chips) for an imaging device, such as system 401 in FIG. 9. The methods of the present invention can also be implemented as computer instructions for execution on a data processing system, such as system 501 of FIG. 10.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system of image processing, the data processing system comprising:
    means for detecting one or more regions in a first image of a high dynamic range scene by comparing values for pixels of the first image with a threshold to generate a mask; and
    means for blurring the mask to generate a weight distribution;
    means for blending the first image and a second image of the high dynamic range scene to generate a third image of the high dynamic range scene according to the weight distribution.

2. The data processing system of claim 1, wherein the first and second images are taken from a same scene using different exposure settings.

3. The data processing system of claim 1, wherein the first and second images are low dynamic images derived from a high dynamic image.

4. An image capturing device, comprising:
    memory;
    an image sensing device coupled to the memory to generate a plurality of images of a scene with a plurality of exposure durations; and
    a processing circuit coupled to the image sensing device, the processing circuit to detect one or more regions in a first image of the plurality of images by comparing values for pixels of the first image with a threshold to generate a mask, the processing circuit to blur the mask to generate a weight distribution, and the processing circuit to blend the first image and a second image of the plurality of images to generate a third image of the scene according to the weight distribution.

5. The device of claim 4, further comprising:
    a housing; and
    a lens coupled to the housing;

wherein the processing circuit and the image sensing device are enclosed within the housing.

6. The device of claim 4, wherein the processing circuit is to further scale the first and second images into a first and second target pixel value ranges.

7. The device of claim 6, wherein the first and second target pixel value ranges are partially overlapping.

8. The device of claim 7, further comprising:
a housing; and
a lens coupled to the housing;
wherein the processing circuit and the image sensing device are enclosed within the housing.

* * * * *

UNITED STATES PATENT AND TRADEMARK OFFICE
CERTIFICATE OF CORRECTION

PATENT NO. : 7,612,804 B1  Page 1 of 1
APPLICATION NO. : 11/059110
DATED : November 3, 2009
INVENTOR(S) : Marcu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1298 days.

Signed and Sealed this

Nineteenth Day of October, 2010

David J. Kappos
*Director of the United States Patent and Trademark Office*